United States Patent
Bingham et al.

(10) Patent No.: US 10,416,629 B1
(45) Date of Patent: Sep. 17, 2019

(54) ACOUSTIC CONTACT SENSORS

(71) Applicant: X Development LLC, Mountain View, CA (US)

(72) Inventors: Jeffrey Thomas Bingham, San Francisco, CA (US); Bruce Schena, Menlo Park, CA (US)

(73) Assignee: X Development LLC, Mountain View, CA (US)

( * ) Notice: Subject to any disclaimer, the term of this patent is extended or adjusted under 35 U.S.C. 154(b) by 183 days.

(21) Appl. No.: 15/357,811

(22) Filed: Nov. 21, 2016

(51) Int. Cl.
| | | |
|---|---|---|
| *G05B 19/042* | (2006.01) | |
| *G01H 7/00* | (2006.01) | |
| *G05B 19/048* | (2006.01) | |
| *G06F 3/16* | (2006.01) | |

(52) U.S. Cl.
CPC .......... *G05B 19/042* (2013.01); *G01H 7/00* (2013.01); *G05B 19/048* (2013.01); *G06F 3/16* (2013.01); *G05B 2219/23181* (2013.01); *G05B 2219/37351* (2013.01)

(58) Field of Classification Search
CPC ............ G05B 19/042; G05B 19/048; G05B 2219/23181; G05B 2219/37351; G01H 1/00–16; G01H 5/00; G01H 7/00; G06F 3/16
See application file for complete search history.

(56) References Cited

U.S. PATENT DOCUMENTS

| | | | | |
|---|---|---|---|---|
| 2012/0048027 | A1* | 3/2012 | Hashiguchi | B25J 9/0087 73/763 |
| 2014/0118307 | A1* | 5/2014 | Berget | H03H 9/02535 345/177 |
| 2014/0276078 | A1 | 9/2014 | Schweitzer et al. | |
| 2014/0290332 | A1* | 10/2014 | Yamashita | A63B 69/36 73/11.01 |
| 2017/0330553 | A1* | 11/2017 | Garlepp | B06B 1/0629 |

OTHER PUBLICATIONS

Brenna D. Argall et al., "A survey of Tactile Human-Robot Interactions," Robotics and Autonomous Systems, vol. 58, Issue 10, Oct. 31, 2010, pp. 1159-1176.

* cited by examiner

*Primary Examiner* — Adam R Mott
(74) *Attorney, Agent, or Firm* — Fish & Richardson P.C.

(57) ABSTRACT

Methods, systems, and apparatus, including computer programs encoded on a computer storage medium, for causing a transducer to transmit an acoustic input signal into a member of a device. Receiving a detection signal representing reverberations of the input signal traveling within the member from a receiver. Detecting a contact of the member with an object external to the member based on a change in the detection signal, where the change in the detection signal represents an alteration in the reverberations of the input signal caused by the contact of the member with the object. Determining a position along the member of a point of the contact of the member with the object based on the change in the detection signal.

23 Claims, 7 Drawing Sheets

ACOUSTIC CONTACT SENSORS

TECHNICAL FIELD

This disclosure generally relates to sensors that detect contact with a device and characteristics of the contact. More particularly the disclosure relates to processes for detecting contact with a device using active acoustic vibrational sensors and controlling the operation of the device based on changes in acoustic vibrations due to the contact.

BACKGROUND

Contact sensors are used in various different technical fields ranging from touch sensitive displays to robotics and automation. Various types of sensors are used in such fields for detecting contact with an object, such as another device or a human. For example, resistive or capacitive touch sensors are used in touch sensitive displays. Pressure sensitive devices are also used in some contexts such as robotics.

SUMMARY

This specification describes systems, methods, devices, and other techniques for detecting and identifying characteristics of a physical contact with a device such as a robot, and controlling the operation of the device based on characteristics of the contact. Acoustic signals can be transmitted into a component of a robotic device, such as a mechanical arm linkage, and the reverberations of the acoustic signal within the component can be detected by an acoustic receiver coupled to the component. The receiver detects the acoustic reverberations and generates electrical detection signals that are representative of the acoustic reverberations but which can be processed by a processor of the robotic device to detection contact between the component of the device and an object external to the device. A detection signal, in general, is an electrical signal that is generated by a receiving device and is a representation of a reverberation signal or other acoustic signal(s) (e.g., a transmitted signal with no reverberations or reflections) detected by the acoustic receiving device. The processors of the robotic device can also analyze the detection signals to determine characteristics of the contact (e.g., contact pressure and location of contact along the component) and characteristics of the object (e.g., density). The robotic device can then control the operation of the component based on the identified characteristics. For example, based on an analysis of a detection signal, the robotic device may determine that the side of its mechanical arm has contacted a hard object, such as a table. In response, the device can move the arm upwards, away from the table.

More generally, this disclosure relates to acoustic sensors and a method for operating acoustic sensors to transmit acoustic vibrations into a device or a component of a device and identify a physical contact between the device and an external object based on changes in the acoustic vibrations caused by the physical contact.

Acoustic sensors include a transducer and a receiver both acoustically coupled to an acoustically conductive component of a device (e.g. a structural member of a mechanical device). An acoustically conductive component is a component formed from a material or materials which provide a conduction path through which acoustic vibrations in at least a range of frequencies can propagate without undue attenuation. For example, in an acoustically conductive material acoustic vibrations generated by a transducer can propagate to an associated receiver without undue attenuation such that the power of the vibrations within a detection threshold of the receiver (e.g., above a noise floor of the receiver). Both the transducer and receiver are electrically coupled to a sensor controller which controls their operation. The transducer generates a predefined acoustic vibration signal which is transmitted into the component. The receiver detects the acoustic reverberations of the transmitted signal from within the component and sends a detection signal to the controller. The detection signal is an electrical signal corresponding to the acoustic detection signal generated by the receiver in response to detecting the acoustic detection signal. The detection signal can be processed to extract acoustic signal that can be correlated with physical properties of the component.

The controller monitors the detection signal for characteristics that are indicative of physical contact. The controller can detect when an external object comes into contact with the component by changes in the detection signal and can correlate specific changes to various attributes of the contact and the object. For example, the controller can correlate changes in the detection signal to attributes including, but not limited to, the location of the contact along the component, the pressure of the contact (hard or soft), the density of the contacting object, when the contact occurs, and when the contact is removed.

In some implementations, the transducer and receiver are placed on two separate parts of a device component. For example, the transducer can be acoustically coupled to one finger of a mechanical gripper and the receiver can be acoustically coupled to another, different finger of the gripper. Arranged in such a configuration, the acoustic sensor can be used to determine, e.g., when the gripper has closed around an object (e.g., when both fingers are in contact with the object), the pressure of the grip on the object, and the density of the object. When the gripper is closed (e.g., the fingers are in direct contact with each other) or when an object is held between the two fingers of the gripper, the acoustic signal transmitted into one finger by the transducer will travel through the first finger and the object (if present) and into the second finger where the signal and any reverberations will be received by the receiver.

The signal received by the receiver will vary depending on whether the gripper is open or closed, whether an object is in contact with one or both fingers, the pressure of the grip on the object, the density of the object, etc. In other words, the receiver will receive one set of reverberations when the gripper is closed on itself, another set of reverberations, if any, when the gripper is open, and a third set of reverberations when the gripper is closed on an object. Each of the three sets of reverberations may differ in various characteristics, such as power and latency. For example, the reverberations may not even be detected by the receiver or the power may be very low when the gripper is open. The reverberations may have a longer latency from transmission to reception at the receiver when the gripper is closed on an object due to the longer signal path and attributes of the object such as its density. The controller can detect such variations in the detection signal and correlate them with various attributes of the contact between the gripper and the object and, in some implementations, attributes of the object itself. In some implementations, such data can further be used to control the operation of the device, e.g., opening or closing and increasing or reducing a grip pressure of the gripper.

In general, innovative aspects of the subject matter described in this specification can be embodied in methods that include the actions of causing a transducer to transmit an acoustic input signal into a member of a device. Receiving a detection signal representing reverberations of the input signal traveling within the member from a receiver. Detecting a contact of the member with an object external to the member based on a change in the detection signal, where the change in the detection signal represents an alteration in the reverberations of the input signal caused by the contact of the member with the object. Determining a position along the member of a point of the contact of the member with the object based on the change in the detection signal. Other implementations of this aspect include corresponding systems, apparatus, and computer programs, configured to perform the actions of the methods, encoded on computer storage devices. These and other implementations can each optionally include one or more of the following features.

Some implementations include controlling an actuator to maneuver the member in response to the contact. Some implementations include generating a power spectrum of the detection signal.

In some implementations, determining the position along the member of a point of the contact includes determining the position based on a change in a power of the detection signal at a frequency.

Some implementations include determining an attribute of the object based on a change in the detection signal. Some implementations include controlling an actuator to maneuver the member in response determining the attribute of the object.

In some implementations, the input signal is a Gaussian white noise signal.

In some implementations, the input signal is a set of tones calibrated to produce a detection signal with a generally flat power spectrum when an object is not in contact with the member.

In some implementations, determining the position along the member of the point of the contact of the member with the object based on the change in the detection signal includes analyzing the detection signal with a machine learning model to determine the position along the member of the point of the contact of the member with the object.

In another general, innovative aspects of the subject matter described in this specification can be embodied in methods that include the actions of causing a transducer to transmit an acoustic input signal into a first member of a device. Receiving a detection signal representing the acoustic input signal traveling from the first member to the second member from a receiver coupled to a second member of the device. Determining that an object is located between and in contact with both the first member and the second member based on the detection signal. Other implementations of this aspect include corresponding systems, apparatus, and computer programs, configured to perform the actions of the methods, encoded on computer storage devices. These and other implementations can each optionally include one or more of the following features.

In some implementations, the input signal is a pulsed signal.

Some implementations include determining a contact pressure with the object based on the detection signal.

Some implementations include controlling an actuator to position the first and second members to change the contact pressure.

Some implementations include determining an attribute of the object based on the detection signal.

Some implementations include controlling an actuator to position the first and second members to change a contact pressure with the object based on the determined attribute.

Some implementations include generating a power spectrum of the detection signal, and determining that the object is located between and in contact with both the first member and the second member based on the detection signal includes determining that the object is located between and in contact with both the first member and the second member based on the power spectrum of the detection signal.

In some implementations, determining that the object is located between and in contact with both the first member and the second member based on the detection signal includes analyzing the detection signal with a machine learning model to determine that the object is located between and in contact with both the first member and the second member.

In another general, innovative aspects of the subject matter described in this specification can be embodied in a device that includes an acoustic sensor that is acoustically coupled to an acoustically conductive member of the device, an actuator that is coupled to the member of the device, and a control system coupled to the acoustic sensor and the actuator. The control system includes one or more processors and a data store coupled to the one or more processors having instructions stored thereon which, when executed by the one or more processors, causes the one or more processors to perform operations of controlling the acoustic sensor to transmit an acoustic input signal into the member. Receiving a detection signal representing reverberations of the input signal traveling within the member from the acoustic sensor. Detecting a contact of the member with an object external to the member based on a change in the detection signal. And, Controlling the actuator to maneuver the member in response to detecting the contact of the member with the object. This and other implementations can each optionally include one or more of the following features.

In some implementations, the operations include determining, based on the change in the detection signal, a position along the member of a point of the contact of the member with the object.

In some implementations, detecting the contact of the member with the object external to the member includes analyzing the detection signal with a machine learning model to detecting the contact of the member with the object external to the member.

In some implementations, the acoustic sensor includes a transducer and a receiver. In some implementations, the transducer and the receiver are both acoustically coupled to the member. In some implementations, the acoustic sensor includes a piezoelectric transceiver.

Particular implementations of the subject matter described in this specification can be implemented so as to realize one or more of the following advantages. Implementations of the present disclosure may provide the ability to distinguish contact with external objects from internal noise of a system. Implementations of the present disclosure may provide an economically inexpensive physical contact sensing system compared to other contact sensing methods such as capacitive sensing. Implementations may provide a minimally intrusive contact sensing system for robotic devices. Implementations may be able to detect a variety of information from a transmitted acoustic input signal, such as contact detection, contact location, contact pressure, characteristics of a contacted object, locations of structural defects, or combinations thereof. Implementations may be able to detect contact with materials that are otherwise undetectable by other methods such as capacitive touch sensing. Implementations can be installed in a robotic a system with minimal, if any, changes required to the existing architecture of the system.

The details of one or more implementations of the subject matter of this disclosure are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
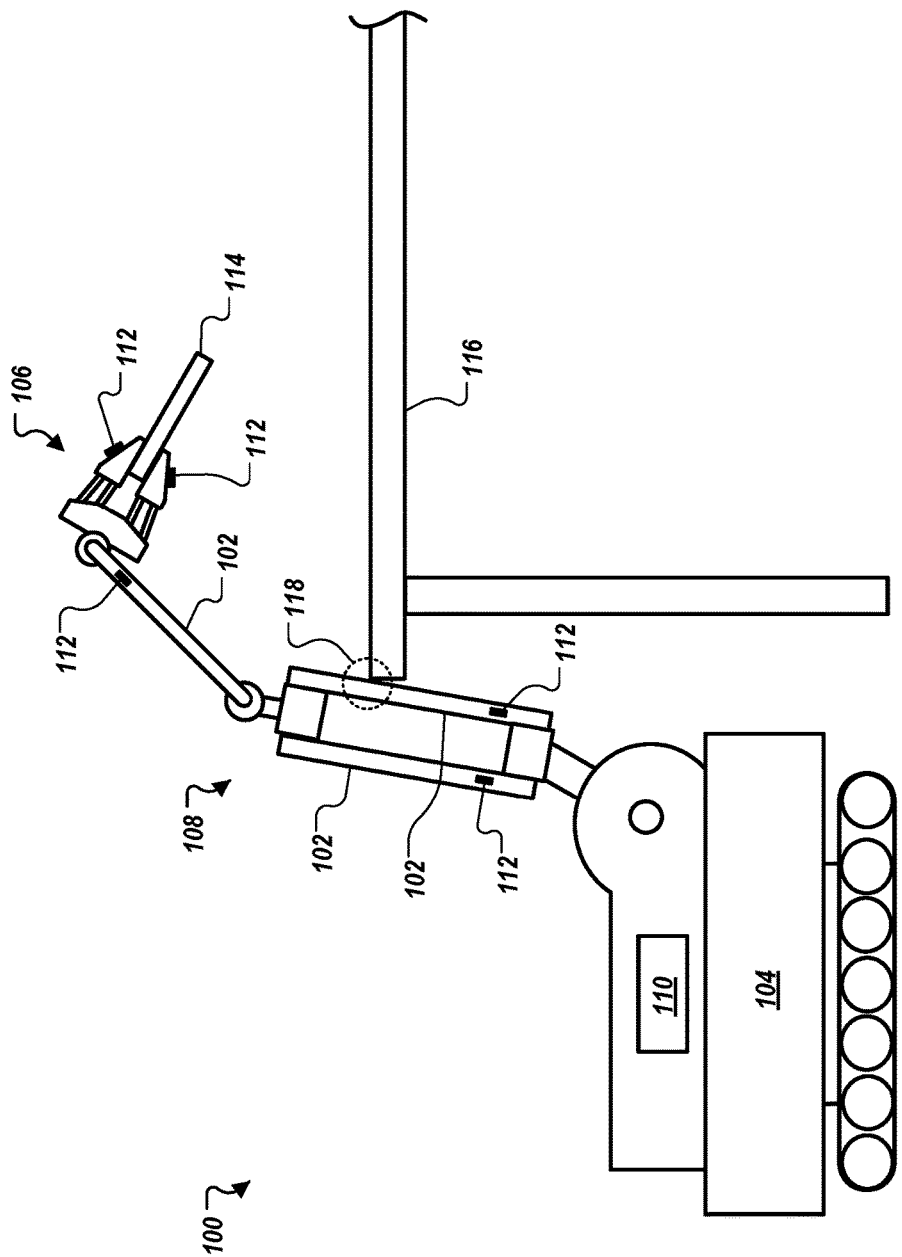
FIG. 1 depicts an example mechanical device that employs acoustic sensors according to implementations of the present disclosure.

FIG. 1 depicts an example mechanical device 100 that employs acoustic sensors to detect contact between the device 100 and external objects. In the example illustrated, the mechanical device 100 is a mobile robotic arm. The device 100 includes actuable members such as mechanical linkages 102. For example, actuable members are components of the device that are connected to electrical, hydraulic, or other types of actuators which the device 100 can control in order to move (i.e., to actuate) the actuable member. The mechanical linkages 102 are movably coupled to a body 104 of the device 100. The linkages 102 form a mechanical arm 108 assembly that extends and has a gripper 106 coupled to a distal end of the arm. The body houses a computerized control system 110 that controls the device 100. The control system 110 can control the operation of the arm 108 by, e.g., controlling actuators such as motors or hydraulic systems that are mechanically coupled to the arm linkages 102 and the gripper 106. In addition, the control system 110 can control a propulsion system of the device 100, e.g., a motor or engine to drive wheels or tracks attached to the body 104.

Acoustic sensors 112 are attached to the mechanical linkages 102 of the device 100 and to the gripper 106. The acoustic sensors 112 can include a transducer/receiver pair, one or more transceivers, a transducer and two or more receivers, or a network of multiple transducers and receivers. The sensors 112 can include a pair of piezoelectric transducers that function as a transmitter receiver pair or one or more individual piezoelectric transducers that function to both transmit and receive signals (e.g., as a transceiver). The sensors 112 are acoustically coupled to the components of the device 100 such that acoustic vibration signals from the transducer are transferred into the device component and reverberations from the signals propagating within the component are received by the receiver. For example, the sensors 112 can be coupled to a component using mechanical clamping device(s), double-sided tapes, mechanical adhesives (e.g., epoxy), mechanical fasteners (e.g., screws, rivets, bolts, etc.). In some implementations, the sensors 112 can be coupled to a component such as a frame, body panels, floors, windows, or walls of a building, vehicle, or device to detect and classify contacts with the structural portions of such building, vehicle, or device.

The acoustic sensors 112 can be coupled to and controlled by the control system 110. In some implementations, the sensors 112 can be coupled to a sensor controller which can be programmed to control the sensors 112 and transmit sensor data to a control system 110 of a device to which the sensors 112 are attached. In some implementations, sensor controllers are integrated into the device's control system 110.

The sensors 112 can be used to detect contact between a linkage 102 of the device 100 with an external object (e.g., workbench 116) by transmitting a predefined acoustic vibration signal into the linkage 102 and monitoring the acoustic reverberation signals (acoustic waves propagating within a material) that results from the transmitted input signal propagating throughout the linkage 102 and reflecting off of boundaries of the linkage 102. A reverberation signal, in general, refers to an acoustic reverberation signal within a material. The sensors 112 detect the reverberations of the transmitted signal from within the linkage 102 and generate an electrical detection signal representative of the detected reverberations. The sensors 112 send the detection signal to the control system 110. The control system 110 can detect when an external object comes into contact with the linkage 102 based on changes in the detection signal.

For example, when an external object comes into contact with a linkage 102, a portion of the acoustic signal propagating within the linkage 102 will be coupled into the object. The amount of energy transferred will depend on, among other things, the material properties of the object, the location of the contact along the linkage 102 in relation to the sensor 112, and the pressure of the contact. In addition, the contact may change the way in which the acoustic signal is reflected within the linkage 102 which, in turn, will change the interference pattern between reflected waves of the signal within the linkage 102. Accordingly, changes in the reverberation signal that indicate a contact between a linkage 102 and an external object can be detected as changes in the power spectrum of the detection signal such as increases or decreases of power (e.g., amplitude) at particular frequencies. The power spectrum of the reverberation signal represents the distribution of power in the signal along its frequency components.

In some implementations, the control system 110 can correlate specific changes in the detection signal to various attributes of the contact and the object. For example, the control system 110 can correlate changes in the detection signal to attributes including, but not limited to, the location of the contact along the linkage 102, the pressure of the contact (hard or soft), the density of the object, when the contact occurs, and when the contact is removed. For example, a change in power at a particular frequency or set of frequencies may be indicative of a particular type of object (e.g., an acoustic "fingerprint" of the object) or a location of the contact relative to the sensor 112 (e.g. a distance from the sensor along the linkage 102). As another example, a particular shift in the power spectrum of the detection signal across a set of frequencies may indicate an increase in pressure of the contact.

A computer controlled device 100 can use such physical contact data to navigate or to more precisely control operations of the device 100. For example, the device 100 may be used to gather parts for an assembly line and place them on a workbench 116. The sensors 112 in the linkages 102 can continuously or periodically transmit a signal into the respective linkages 102. While placing the object 114 on the workbench 116, the arm 108 may begin to brush against the workbench 116. The contact 118 of an arm linkage 102 with the workbench 116 will cause the reverberations received by the sensor 112 coupled to that particular linkage 102 to change. The control system 110 can detect such changes in the detection signal and determine that the linkage has contacted 118 the workbench 116, and, in some implementations, the location of the contact 118 along the linkage 102. In response, the control system 110 can control the actuators that control the linkage 102 in which the contact 118 was detected in order to maneuver the arm 108 away from the workbench 116.

As noted above, the acoustic sensors 112 are controlled to supply a predefined signal to the device component to which they are attached. The predefined signal can be, but is not limited to, a Gaussian white noise signal, a set of tones at predetermined frequencies, a pulsed signal or sequence of pulsed signals. Detecting contact with a component by actively transmitting a predefined signal into a component as opposed to passively detecting acoustic noise due to contact with the component may aid in distinguishing actual contacts from mechanical noise generated by the operation of the device 100. Moreover, the predefined signal can be transmitted continuously (e.g., a continuous noise signal) or periodically (e.g., a timed pulse signal). A periodically transmitted signal permits the detection of timing changes such changes in the latency between reflected signals. For example, changes in latency may be used to detect the location of a contact point along a component, e.g., by determining the distance of the contact point from a sensor 112.

Figure 2:
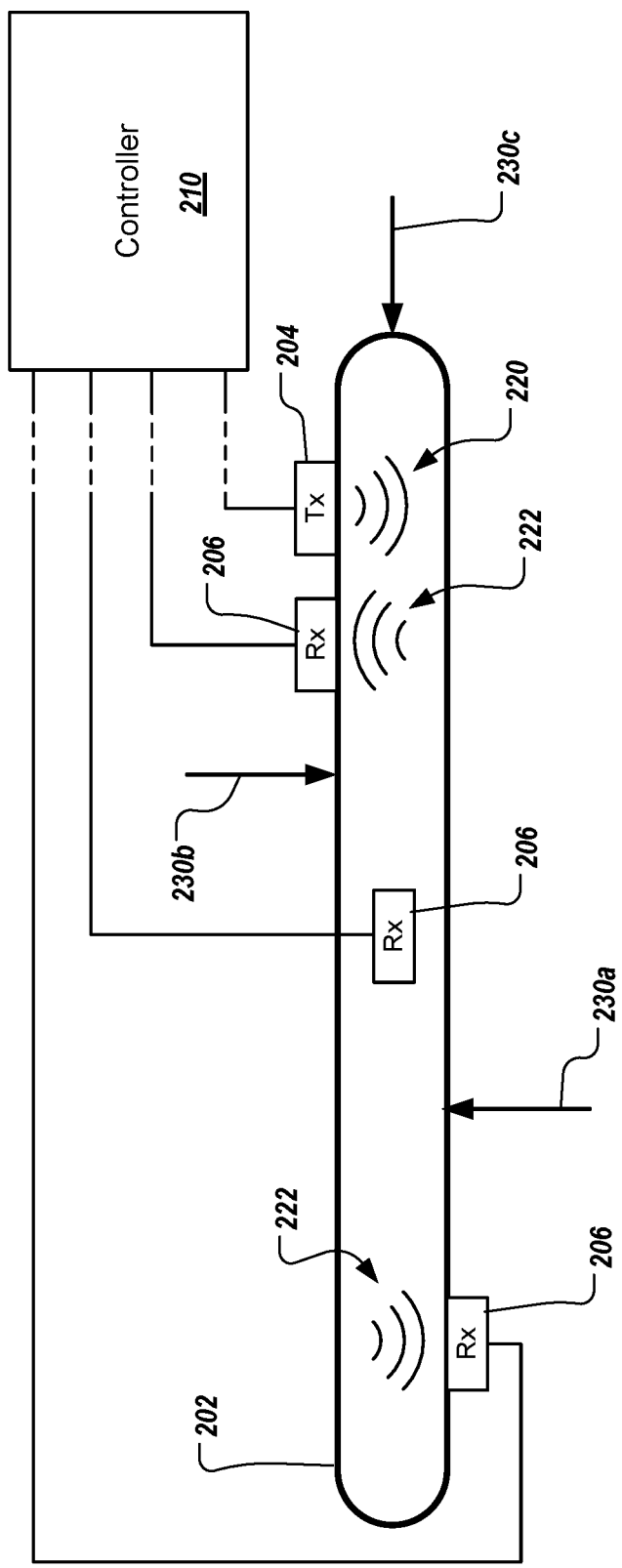
FIG. 2 depicts an example configuration of acoustic sensors.

FIG. 2 depicts an example configuration of acoustic sensors 112 on a component 202 of a device (e.g., a linkage 102 of device 100). The sensor configuration shown includes a transducer 204 and three receivers 206 coupled at various positions along the component 202. While sensor 112 includes one transducer 204 and three receivers 206, in general sensors may include any number of transducers and receivers in differing arrangements depending, e.g., on the particular application, level of sensitivity, or type of contact information desired. The transducer 204 and receives 206 are in electronic communication with a controller 210. The controller can be a sensor controller or a control system 110 for a mechanical device.

The transducer 204 transmits a predefined acoustic input signal 220 into the component 202 and the receivers 206 receive reverberations 222 of the input signal 220 propagating through the component 202. The reverberations 222 can include the input signal 220 itself along with internal reflections of the input signal 220 generated by the propagation of the signal 220 within the component 202. The receivers 206 each generate and send a detection signal to the controller 210. The detection signal sent by the receivers 206 to the controller 210 is an electronic representation of the reverberations 222 received by the receiver. The detection signal can be an analog or digital signal.

The controller 210 analyzes the received detection signals to detect any contact by an external object with the component 202. (Various physical contact locations are indicated by arrows 230a-230c.) The controller 210 can monitor the reverberations signals by generating a time varying power spectrum of the detection signals and analyze the power spectrums for changes. For example, the controller 210 can compare a received detection signal to a stored "baseline" detection signal of the input signal 220 propagating within the component 202 with no objects in contact with the component 202. The controller 210 can detect a contact with the component 202 by detecting deviations from the baseline detection signal.

For example, a change in power at a particular frequency or set of frequencies may be indicative of a particular type of object (e.g., an acoustic "fingerprint" of the object) or a location of the contact relative to the sensor 112 (e.g. a distance from the sensor along the linkage 102). For example, an increase in the power spectrum of the detection signal at a particular frequency can indicate a distance of a contact 230 with an object from the particular receiver 206 along the component 202. Such information may be sufficient to determine the location of the contact 230 along the component.

In some implementations, multiple receivers 206 can be used to disambiguate contact locations. For example, each receiver 206 may indicate an increase in received reverberation power spectrum at different frequencies, thus, indicating that a contact (e.g., contact 230a) that has occurred is located at different distances from each of the receivers 206. The controller 210 can then triangulate the distances of the contact 230a as indicated by each receiver 206 to disambiguate between multiple possible points of contact (e.g., 230b and 230c) and, thereby, more accurately determine an actual location of the point of contact 230a on the component 202. Specifically, both contact points 230a and 230b are illustrated as being equidistant from the center receiver 206. However, contact point 230a is closer to the leftmost receiver 206 and contact point 230b is closer to the rightmost receiver 206. Thus, the controller 210 can disambiguate the data received from the center receiver 206 based on the data received from the one or both of the other receivers 206.

As another example, a particular change in the power spectrum can be used to indicate the type of material that contacted the component 202. For example, different materials will couple with the reverberation signal in the component 202 differently based on characteristics of the material such as density. The controller 210 can use stored data related to how different materials change the power spectrum (e.g., acoustic "fingerprints") to identify the type of object in contact with the component 202. For example, the controller 210 can use stored acoustic "fingerprints" to distinguish a contact with human skin from a contact with a hard object such as a workbench.

Furthermore, as noted above, additional changes in the power spectrum, e.g., continued increases/decreases in power or shifts of power increases at a set of frequencies can be used to indicate increases/decrease in the pressure of a contact. In some implementations, data indicating the type of object in contact with a component 202 and data indicating changes in the pressure of the contact can be used to as gesture controls for a device. For example, gesture controls can be defined for a device such that human touch can be used to guide the operation of a device. For example, if the controller 210 detects a contact with human skin, at a particular location of the component, and increasing in pressure, the controller 210 can control the operation of the device according to preset gesture commands. Referring briefly to FIG. 1, a touch on the upper portion of the upper linkage 102 with increasing in pressure may be used to indicate that the device 100 should move the arm 108 downward, for example. In response, the device 100 can control the arm to move according to the detected gesture command.

In some implementations, the input signal 220 can be calibrated to the propagation characteristics of the component 202. For example, the input signal 220 can be a set of tones at different frequencies. However, each frequency may propagate differently within the component 202 and the resulting reverberation power spectrum may be uneven. That is, although the tones of the input signal 220 may be all transmitted at the same amplitude, the resulting reverberation power spectrum may include undesirable peaks and troughs due to the characteristics of the component 202. Therefore, input signal 220 can be calibrated to the component 202 to create a relatively "flat" baseline reverberation power spectrum. A "flat" baseline power spectrum refers to a spectrum in which the power at a set of frequencies related to the input signal are all within a predefined threshold of each other. For example, the input signal can be calibrated to produce a reverberations signal power spectrum that is −10 dB/Hz (±3 dB/Hz) in the range 2 kHz to 10 kHz when an object is not in physical contact with the component 202. Such implementations may improve the detectability of contacts and contact characteristics such as contact location and object type because changes to a "flat" baseline reverberation spectrum may be easier to detect than changes in a cluttered and uneven reverberation spectrum.

In some implementations, such as those with multiple transducers, interference between multiple input signals into the same component can be disambiguated by synchronizing the timing of the multiple signals. For example, an input signal from one transducer can be transmitted during a first time period and an input signal from another, different transducer can be transmitted during a second time period while the first transducer is not transmitting. In some implementations, transducer synchronization can also be used to prevent or reduce cross-talk of input signals that are transmitted by different acoustic sensors into different, but coupled components of a device.

Figure 3:
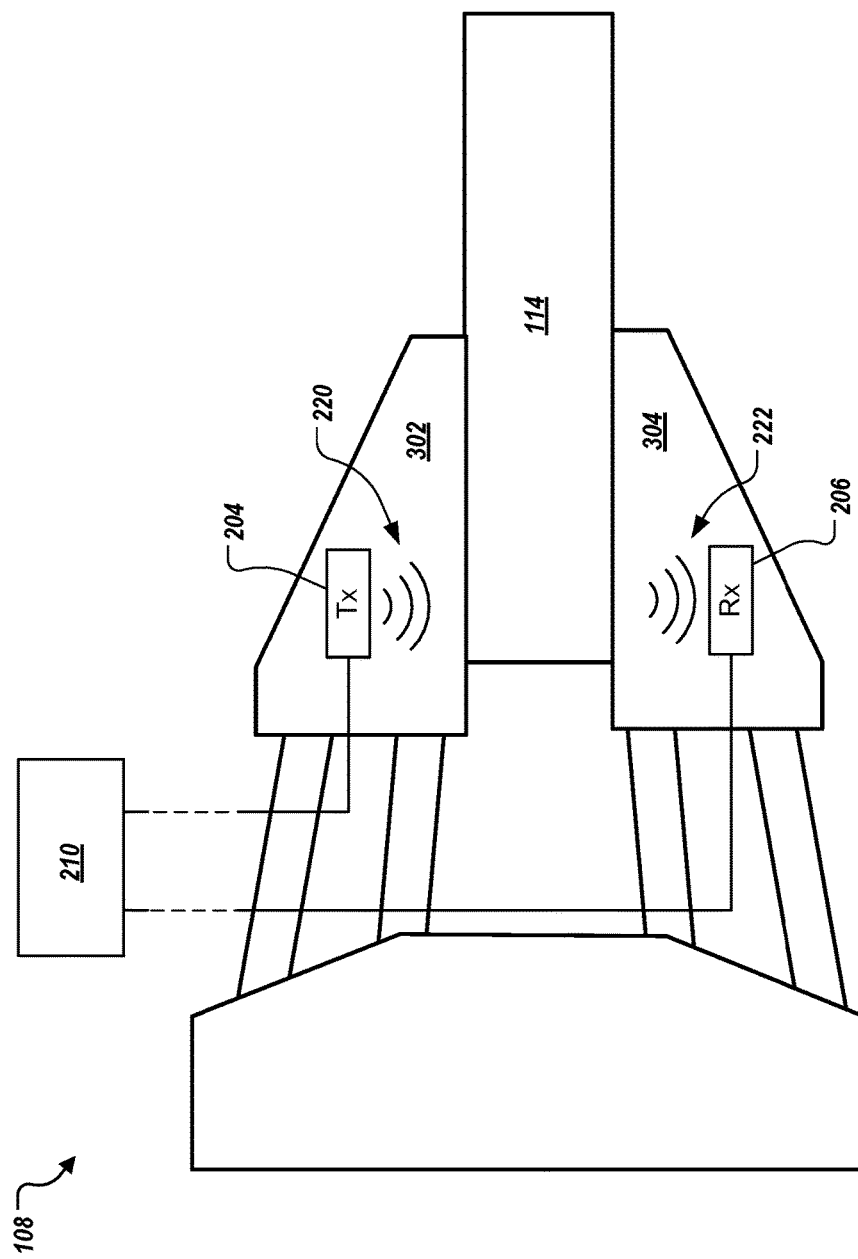
FIG. 3 depicts a second example configuration of acoustic sensors.

Referring to FIGS. 1 and 3, in some implementations, the transducer 204 and receiver 206 of an acoustic sensor 112 can be coupled to separate members of a device component. For example, the transducer 204 can be acoustically coupled to one member 302 of a mechanical gripper 106 (e.g., a finger or claw) and the receiver 206 can be acoustically coupled to another, different member 304 of the gripper 106. As in the implementation discussed above, the transducer 204 a receiver 206 are in electronic communication with a controller 210 to control the operations of the acoustic sensor 112.

The transducer 204 transmits the input signal 220 into one member 302 and the reverberations 222 can be received by the receiver 206 in through the other member 304. The received reverberations 222 and corresponding detection signal sent to the controller 210 will vary depending on whether the members 302, 304 are in in contact with each other, whether an object 114 is in contact with one or both members 302, 304, the pressure of the grip on the object 114, the density of the object 114, etc. In other words, the receiver 206 will receive one set of reverberations when the gripper 106 is closed on itself (i.e., the members 302, 304 are in direct contact with no object in between), another set of reverberations, if any, when the gripper 106 is open with no object in between, and a third set of reverberations when the gripper is closed on an object 114. The controller 210 can detect such variations in the detection signal and correlate them with various attributes of the contact between the gripper members 302, 304 and the object 114 and attributes of the object 114 itself.

As discussed above, the controller 210 can identify changes in the power spectrum of the detection signal and correlate such changes to attributes of the contact with the object 114 and/or attributes of the object 114 itself. For example, the controller 210 can determine whether the object 114 is firmly grasped by the gripper 106 when an acoustically conductive path between transducer and receiver is closed), the grip pressure exerted on the object 114, if the object 114 moves or slips as it is raised off the workbench 116, the density of the object 114 and from that estimate an amount of pressure that can be exerted on the object without breaking the object, etc. In some implementations, the controller 210 can measure a thickness of the object 114, e.g., by transmitting pulse input signals and measuring propagation time (signal latency) from the transducer 204 to the receiver 206.

In some implementations, the device 100 can control various operations based on the acoustic sensor 112 data, e.g., increasing or reducing a grip pressure, maneuvering the arm 108 to pick up or put down the object 114. In some implementations, the controller 210 may only activate the acoustic sensor 112 during particular operations of the device 100. For example, the controller 210 may only activate the sensor 112 during gripping operations. The controller 210 can activate the sensor 112 by controlling the transducer 204 to transmit the input signal 220 when a gripping operation is initiated, and deactivate the sensor 112 by turning the transducer 204 off when the gripping operation is complete.

Figure 4:
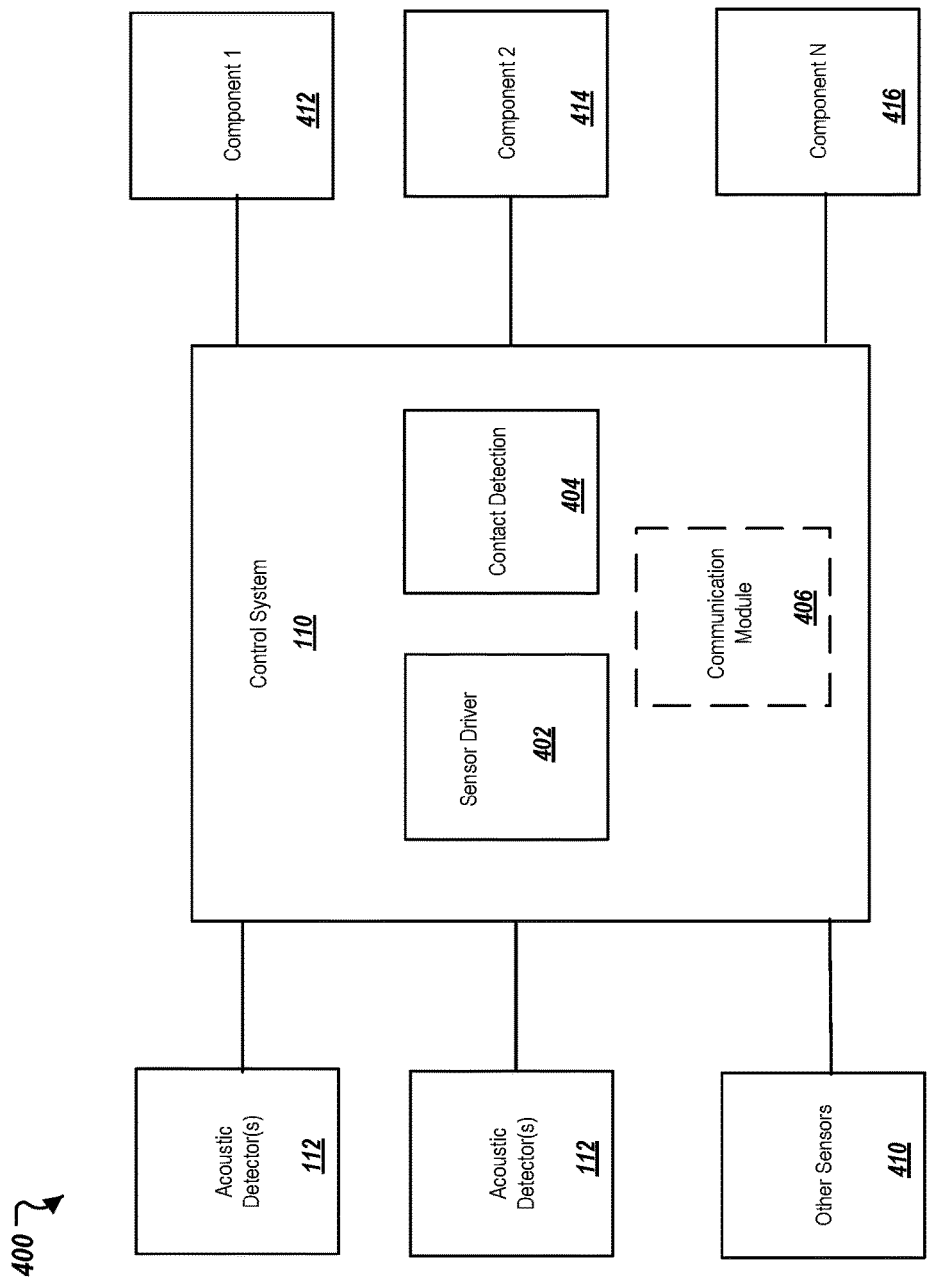
FIG. 4 depicts block diagram of an example control system for a device that employs acoustic sensors in accordance with implementations of the present disclosure.

FIG. 4 depicts block diagram 400 of an example control system 110 for a device that employs acoustic sensors in accordance with implementations of the present disclosure. The control system 110 is in communication with acoustic detectors 112, other sensors 410, and actuators to control the operation of system components 412-416. The control system 110 receives data from acoustic sensors 112 and other system sensors 410, analyzes the received data, and controls the operation of one or more system components 412-416 based on the received data, e.g., as described above in reference to FIGS. 1-3.

The control system 110 includes an acoustic sensor driver 402, a contact detecting module 404 and, optionally, a communication module 406. The control system 110 also includes one or more processors or microcontrollers and electronic data storage (not shown) that stores instructions that, when executed, cause the processors and/or microcontrollers to process, manipulate, or analyze data from the sensors 112, 410 and control the operation of the system components 412-416.

The acoustic sensor driver 402 can be implemented as a hardware or software module of the system 110. The acoustic sensor driver 402 controls the operation of the acoustic sensor transducer(s). The acoustic sensor driver 402 can control the operation of acoustic sensor 112 transducers by, e.g., selecting and sending input signals to the transducers (e.g., signal 220 discussed above) and controlling the timing of multiple transducers within a network of acoustic sensors 112. For example, the acoustic sensor driver 402 can control an acoustic sensor transducer to continuously transmit a Gaussian white noise signal into a device component. As another example, the acoustic sensor driver 402 can control an acoustic sensor transducer to transmit a series of calibrated tones into a device component. As noted above, the tones can be calibrated such that, when the component is not in contact with an external object, the reverberations of the tones within the component and corresponding detection signal have a generally "flat" power spectrum. For example, as noted above, the input signal can be calibrated such that the power spectrum of the detection signal received by an associated acoustic sensor receiver does not include any amplitude spikes above a threshold tolerance value.

The contact detection module 404 can be implemented as a hardware or software module of the system 110. The contact detection module 404 analyzes data received from the acoustic sensors 112 to detect contact with external objects and determine characteristics of such contact. For example, the contact detection module 404 receives detection signal data from one or more acoustic sensor receivers and analyzes the data to detect a contact between an external object and a device component associated with the acoustic sensor recovers and to determine characteristics of the contact. The contact detection module 404 can compute the power spectrum of a received detection signal and analyze the power spectrum to identify a contact and characteristics of the contact. For example, contact detection module 404 can correlate specific changes in the detection signal to various attributes of a contact with an object. For example, the contact detection module 404 can correlate changes in the detection signal to attributes including, but not limited to, the location of the contact along an associated component, the pressure of the contact (hard or soft), the density of the object, when the contact occurs, when the contact is removed, and a thickness of an object.

In some implementations, the contact detection module 404 can correlate data from multiple receivers to determine a location of a contact on a component. For example, the contact detection module 404 can determine a distance of a contact from multiple receivers of an acoustic sensor 112 based on a power spectrum of a detection signal received from each respective receiver or latency between signal pulses. The contact detection module 404 can use the distances to triangulate a location of the contact on the component.

In some implementations, the contact detection model 404 can incorporate a machine learning model to analyze detection signals and determine characteristics of a contact. The contact detection model 404 can include a machine learning model that has been trained to receive model inputs, e.g., detection signal data, and to generate a predicted output, e.g., contact characteristics, for the received model input. In some implementations, the machine learning model is a deep model that employs multiple layers of models to generate an output for a received input. For example, the machine learning model may be a deep neural network. A deep neural network is a deep machine learning model that includes an output layer and one or more hidden layers that each apply a non-linear transformation to a received input to generate an output. In some cases, the neural network may be a recurrent neural network. A recurrent neural network is a neural network that receives an input sequence and generates an output sequence from the input sequence. In particular, a recurrent neural network uses some or all of the internal state of the network after processing a previous input in the input sequence to generate an output from the current input in the input sequence. In some other implementations, the machine learning model is a shallow machine learning model, e.g., a linear regression model or a generalized linear model.

For example, a machine learning model can be trained to recognize particular acoustic "fingerprints" of contact between external objects and components of a device. For example, the machine learning model can be trained to recognize particular changes in a detection signal that occur when a device component is contacted with various known "training" objects, at various locations, and at various contact pressures. For example, a machine learning model can be trained to recognize acoustic "fingerprints" associated with detection signals for an acoustic sensor 112 coupled to a gripper by analyzing detection signals received when the gripper grasps multiple different objects in a set of test objects, e.g., a block of wood, metal, a book, a container of liquid, etc. Furthermore, the machine learning model can analyze the changes in the detection signals as the grip pressure is increased and decreased on each object and/or when the objects are placed in different locations within the gripper (e.g., when an object is not fully engaged with the entire gripping surfaces of a gripper compared to when an object is fully inserted within a gripper). The machine learning model can subsequently correlate similar changes in the detection signals with respective grip pressures and/or object locations.

Similarly, the machine learning model can be trained to recognize particular changes that occur in a detection signal when a component (e.g., a mechanical linkage) is contacted at different locations. For example, the model can be trained by contacting a linkage with a particular object at various known locations along the linkage. The model can analyze changes in the detection signal when the linkage is contacted at each known location and, subsequently, correlate similar changes with contacts at the respective locations.

In some implementations, the machine learning model can be trained to recognize human interactions with a device and correlate such interactions with commands. For example, if the machine learning model identifies a particular contact with a device component (e.g., a gripper arm linkage) as contact with human skin, the model can monitor the contact for predefined patterns. For example, an increase in pressure on a particular location of a gripper arm may indicate to move the gripper arm in a particular direction. For example, if a user pushes on the top surface or an upper linkage in a gripper arm that may be used as a command to move the arm downwards. However, if a user pushes on the bottom surface or a lower linkage in a gripper arm that may be used as a command to move the arm upwards. Thus, the acoustic sensors 112 in combination with a contact detection module 404 that incorporates machine learning may be used to recognize human guidance to train a device (e.g., a robotic arm) to perform particular tasks or guide the device around obstacles by direct human interaction.

The control system 110 can use the contact data from the contact determination module 404 to control the operation of various components 412-416 of a device. For example, if the contact determination module 404 determines that a gripper is in contact with a soft object, the control system 110 can control the gripper to apply a lower pressure grip than it may apply to a hard or more dense object. If the contact determination module 404 determines that a gripper arm linkage has contacted hard object (e.g., a table), the control system 110 can control a propulsion system to move away from the object or control the arm linkage to maneuver the arm around the object.

In some implementations, the control system 110 includes a communication module 406. The communication module 406 can be implemented as a hardware or software module of the control system 110. The communication module 406 can be a wired communication (e.g., USB, Ethernet) or wireless communication module (e.g., Bluetooth, ZigBee, WiFi). The communication module 406 can be used to communicate directly or indirectly, e.g., through a network, with other remote computing devices, e.g., a laptop, a tablet computer, a control system of a robotic device, a smartphone, etc. For example, in some implementations data such as acoustic "fingerprints" for various object types can be accessed from other computing devices such as internet servers through one or more computer networks.

Figure 5:
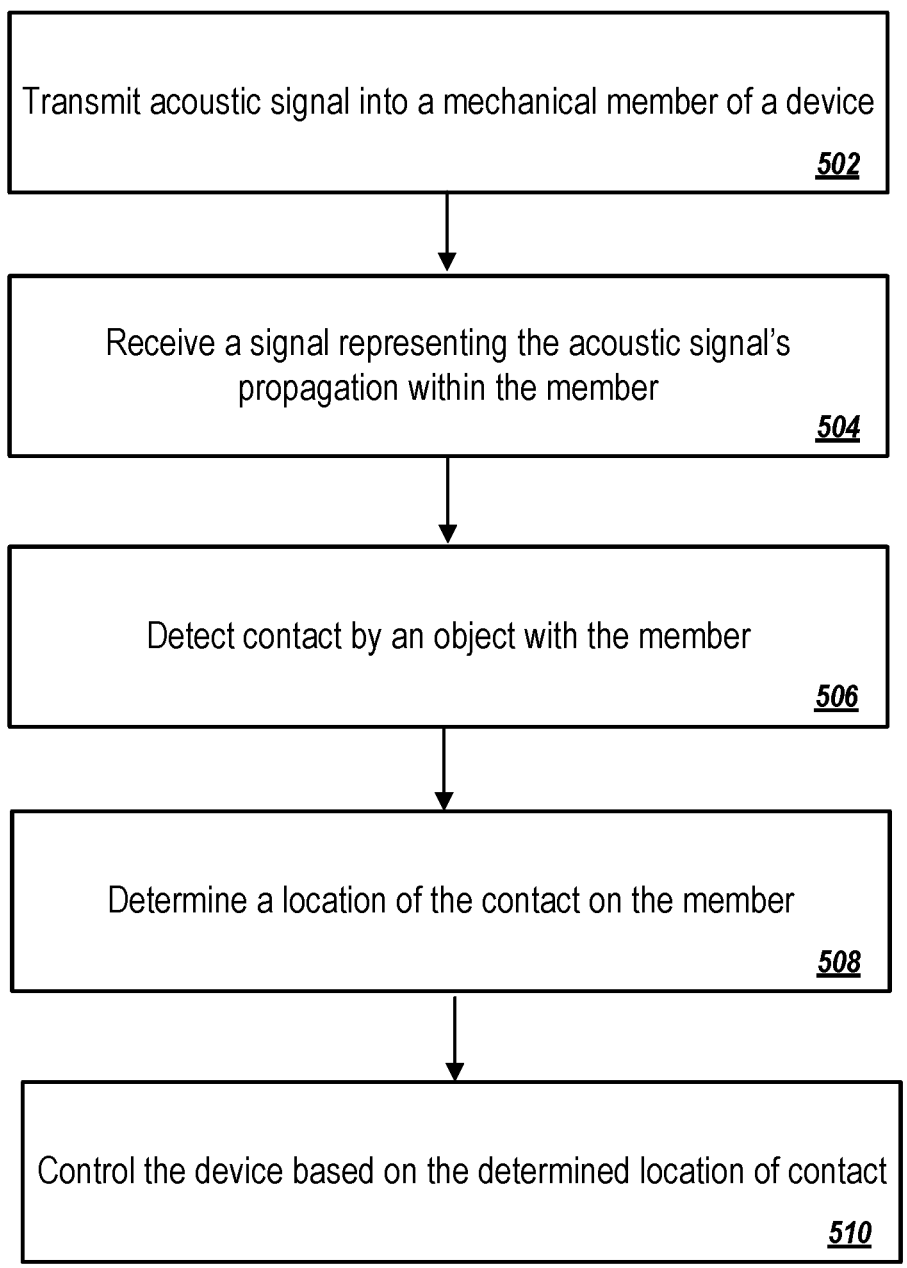
FIG. 5 depicts a flowchart of an example process for identifying a location on a mechanical member of a device of point of contact of object with the member.

FIG. 5 depicts a flowchart of an example process 500 for identifying a location on a mechanical member of a device of point of contact of object with the member. In some implementations, the process 500 can be provided as one or more computer-executable programs executed using one or more computing devices. In some examples, the process 500 is executed by a system such as control system 110 of FIGS. 1 and 4, or a sensor controller such as controllers 210 of FIGS. 2 and 3.

The system causes a transducer to transmit an acoustic signal into a mechanical member of a device (502). For example, the controller can control a transducer or transceiver to transmit a predefined acoustic signal into a moveable component of a device. The component can be a linkage for a robotic device or a member of a more complex component such as a gripper, robotic finger, drive train, gear box, frame, a motor body, a wheel, a user interaction pendant, a thin inflatable membrane, etc. The acoustic signal can be a continuous Gaussian white noise signal or a signal particularly calibrated to the mechanical member.

The system receives a signal representing the acoustic signal's propagation within the member (504). For example, the system can receive a detection signal representing reverberations of the acoustic signal traveling within the member from a receiver. The system detects a contact by an object with the member (506). For example, the system can monitor the received detection signal for changes that indicate physical contact between the member and an external object. The system can compute the power spectrum of the received detection signal and detect a contact based on changes in the power spectrum such as increases or decreases in power at a particular frequency or frequencies that may be caused by vibration from the contact itself or coupling of the input signal into the object.

The system determines a location of the contact on the member (508). For example, based on the changes in the detection signal, the system can determine a distance from the receiver along the member at which the object contacted the member. For example, contact with a given object at a first distance from the receiver will produce a different change in the power spectrum than contact with the same object at a second, different distance from the receiver. The system can detect such differences and correlate them to respective distances from the receiver and calculate the location based on a known location of the receiver on the member of the device.

The system controls the device based on the determined location of the contact (510). For example, the system can control actuators (e.g., motors, hydraulics, etc.) to maneuver the member in accordance with the contact. For example, the system may cause the device to move the member towards or away from the contact, or to increase or decrease a grip pressure on an object.

In some implementations, the system can cause the transducer sequentially transmit different types of input signals. For example, different characteristics of a contact may be more readily detected using particular types of input signals. For example, contact pressure may be more readily determined when a Gaussian white noise input signal is transmitted into a member, but contact location, e.g., distance from a receiver, may be more readily measured when a calibrated set of tones is transmitted into a member. Therefore, the system can alternate between multiple different input signals or selectively chose an input signal to obtain desired information about a contact with an object.

Figure 6:
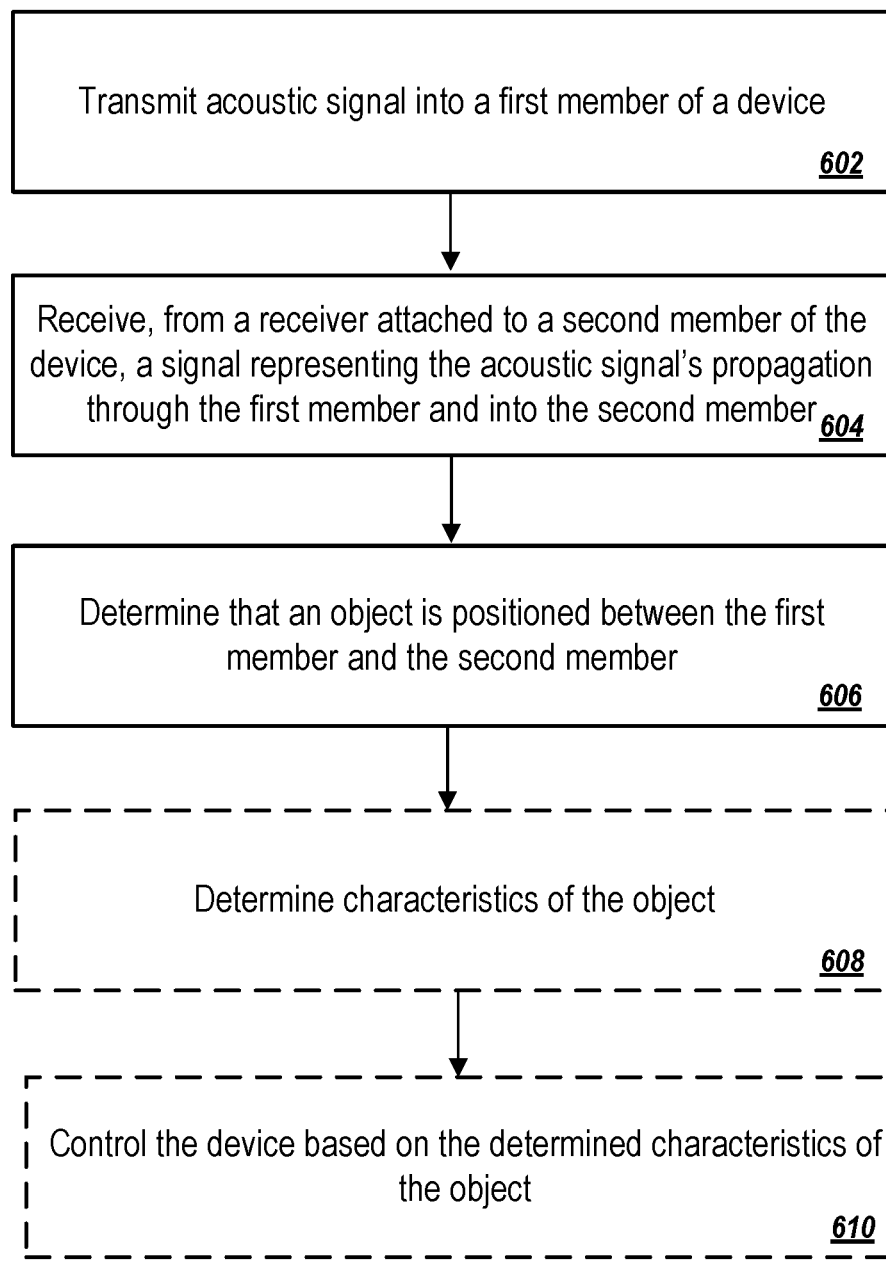
FIG. 6 depicts a flowchart of an example process for identifying an object located between two mechanical members of a device and determining characteristics of the object.

FIG. 6 depicts a flowchart of an example process for identifying an object located between two mechanical members of a device and determining characteristics of the object. In some implementations, the process 600 can be provided as one or more computer-executable programs executed using one or more computing devices. In some examples, the process 600 is executed by a system such as control system 110 of FIGS. 1 and 4, or a sensor controller such as controllers 210 of FIGS. 2 and 3.

The system transmits an acoustic signal into a first member of a device (602). And, the system receives a detection signal representing the acoustic signal's propagation through the first member and into a second member from a receiver attached to the second member (604). For example, a transducer and receiver can be attached to two separate member of a device component such as a robotic gripper, a robotic claw, or robotic fingers. The input acoustic signal produces different reverberations in the second member by propagating through the first member and into the second member depending on whether the two members are or are not in contact with one another or whether an object is located between the two members. The differing reverberations are represented in characteristics of the received detection signal such as differences in power, frequency, or signal latency.

The system determines that an object is positioned between the first and second members (606). For example, the system can determine whether an object is positioned between the first and second members based on detecting changes in the received detection signal. For example, a gripper is in an open position where the members of the gripper are not in physical contact and the gripper is not closed on an object, the detection signal received at the receiver may be weak if detectable at all. By contrast, when the gripper is either closed on itself (e.g., the members are in physical contact with each other) will be stronger and will vary depending on the grip pressure. When the gripper is closed on an object (e.g., the members are closed around an object) the detection signal will be stronger and will vary depending on attributes of the object (e.g., thickness, density, etc.), the grip pressure, and the location of the object within the gripper. The system can detect such changes in the received detection signal and determine whether an object is positioned between the first and second members.

In some implementations, the system can determine characteristics of the object and the grip based on the changes in the received detection signal (608). For example, the system can determine a density of the object, a thickness of the object, grip pressure, and/or a location of the object between the members based on the changes in the received detection signal. In some implementations, the system can cause the transducer sequentially transmit different types of input signals. For example, different characteristics of an object may be more readily detected using particular types of input signals. For example, contact pressure may be more readily determined when a Gaussian white noise input signal is transmitted into a member, but contact location, e.g., distance from a receiver, may be more readily measured when a calibrated set of tones is transmitted into a member. Pulsed input signals can be used to detect propagation time for the input signal to travel from the first member, through the object, and through the second member to the receiver. The system can use the delay time to determine characteristics such as the thickness and/or density of the object. Thus, in some implementations, the system can alternate between multiple different input signals or selectively chose an input signal to obtain desired information about an object.

In some implementations, the system can control the device based on the determined characteristics of the object (610). For example, the system can control operations such as grip pressure based on characteristics of the object. If the system determines that an object located in a gripper is soft or has a low density, the system may apply less grip pressure than if the object were determined to be hard or have a high density.

Figure 7:
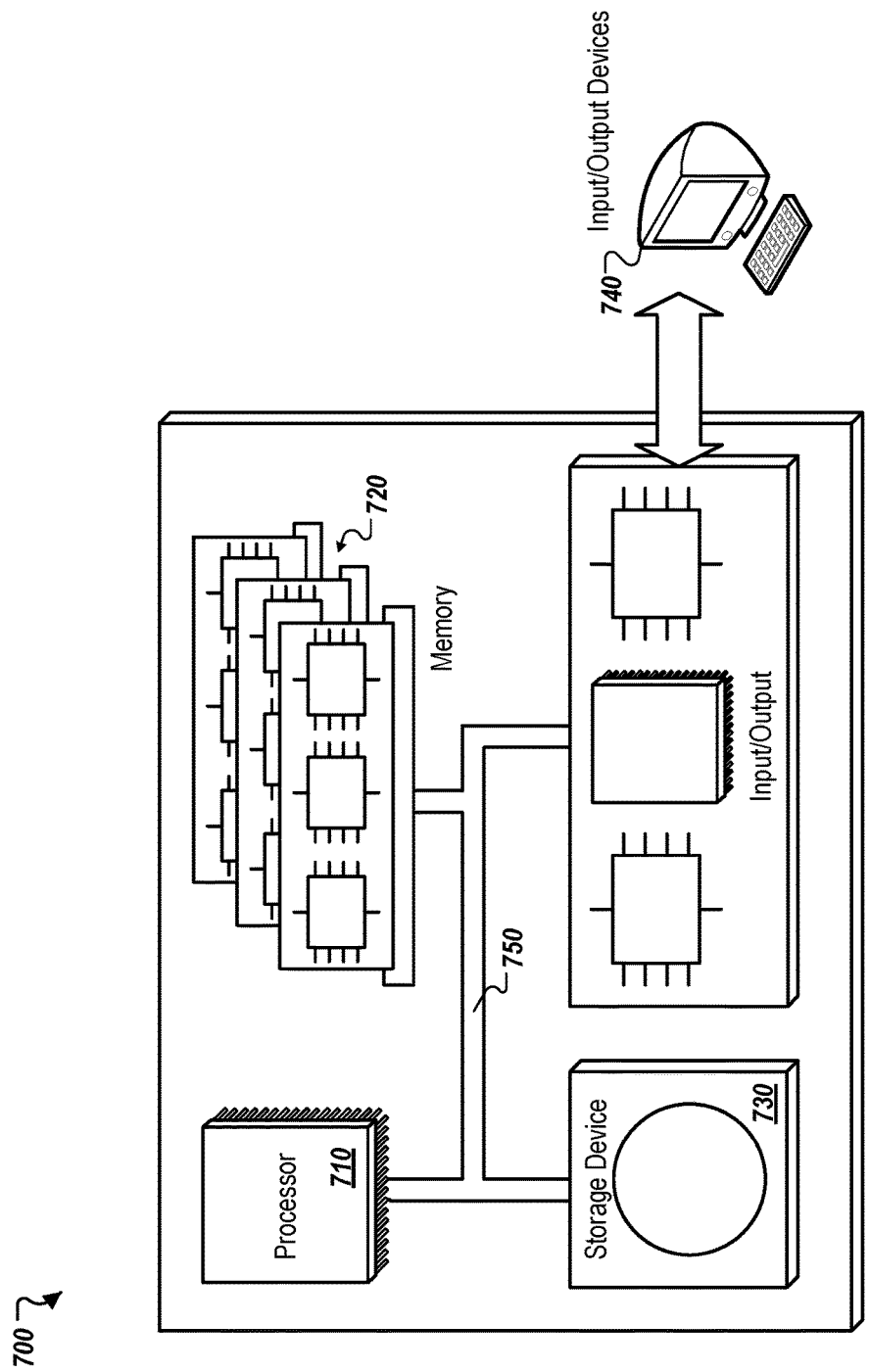
FIG. 7 depicts a schematic diagram of a computer system that may be applied to any of the computer-implemented methods and other techniques described herein.

FIG. 7 is a schematic diagram of a computer system 700. The system 700 can be used to carry out the operations described in association with any of the computer-implemented methods described previously, according to some implementations. In some implementations, computing systems and devices and the functional operations described in this specification can be implemented in digital electronic circuitry, in tangibly-embodied computer software or firmware, in computer hardware, including the structures disclosed in this specification (e.g., system 700) and their structural equivalents, or in combinations of one or more of them. The system 700 is intended to include various forms of digital computers, such as laptops, desktops, workstations, personal digital assistants, servers, blade servers, mainframes, and other appropriate computers, including vehicles installed on base units or pod units of modular vehicles. The system 700 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transducer or USB connector that may be inserted into a USB port of another computing device.

The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. The processor may be designed using any of a number of architectures. For example, the processor 710 may be a CISC (Complex Instruction Set Computers) processor, a RISC (Reduced Instruction Set Computer) processor, or a MISC (Minimal Instruction Set Computer) processor.

In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 may be a floppy disk device, a hard disk device, an optical disk device, or a tape device.

The input/output device 740 provides input/output operations for the system 700. In one implementation, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   causing a transducer to transmit a first acoustic input signal and a second acoustic input signal into a member of a robotic device, wherein the first acoustic input signal is different from the second acoustic input signal;
   receiving, from a first receiver, a first electrical detection signal representing reverberations of the first acoustic input signal traveling within the member as received at a first location along the member;
   receiving, from the first receiver, a second electrical detection signal representing reverberations of the second acoustic input signal traveling within the member as received at the first location along the member;
   detecting a contact of the member with an object external to the member based on a change in at least one of the first electrical detection signal or the second electrical detection signal;
   determining, based on the first electrical detection signal, a position along the member of a point of the contact of the member with the object; and
   determining, based on the second electrical detection signal, a contact pressure of the contact of the member with the object.

2. The method of claim 1, further comprising controlling an actuator to maneuver the member in response to the contact.

3. The method of claim 1, further comprising generating a power spectrum of the at least one of the first electrical detection signal or the second electrical detection signal.

4. The method of claim 1, wherein determining the position along the member of a point of the contact comprises determining the position based on a change in a power of the first electrical detection signal at a frequency.

5. The method of claim 1, wherein the second acoustic input signal is a white noise signal.

6. The method of claim 1, further comprising controlling an actuator to maneuver the member in response determining the contact pressure.

7. The method of claim 1, further comprising receiving, from a second receiver, a third electrical detection signal representing reverberations of the first acoustic input signal traveling within the member as received at a second location along the member;
   wherein determining the position along the member of the point of the contact of the member with the object comprises determining the point of the contact based on both the first electrical detection signal and the third electrical detection signal.

8. The method of claim 1, wherein the first acoustic input signal is a set of tones calibrated to produce a detection signal with a generally flat power spectrum in the member when an object is not in contact with the member.

9. The method of claim 7, wherein determining the position along the member of the point of the contact of the member with the object comprises analyzing the first electrical detection signal and the third electrical detection signal with a machine learning model to determine the position along the member of the point of the contact of the member with the object.

10. A robotic device comprising:
    a transducer acoustically coupled to an acoustically conductive member of the robotic device;
    a first receiver acoustically coupled to the acoustically conductive member of the robotic device at a first location along the member;
    an actuator coupled to the member of the robotic device; and
    a control system coupled to the transducer, the first receiver, and the actuator, the control system comprising one or more processors and a data store coupled to the one or more processors having instructions stored thereon which, when executed by the one or more processors, causes the one or more processors to perform operations comprising:
       controlling the transducer to transmit a first acoustic input signal and a second acoustic input signal into the member, wherein the first acoustic input signal is different from the second acoustic input signal;

receiving, from the first receiver, a first electrical detection signal representing reverberations of the first acoustic input signal traveling within the member as received at the first location;

receiving, from the first receiver, a second electrical detection signal representing reverberations of the second acoustic input signal traveling within the member as received at the first location along the member;

detecting a contact of the member with an object external to the member based on a change in at least one of the first electrical detection signal or the second electrical detection signal;

determining, based on the first electrical detection signal, a position along the member of a point of the contact of the member with the object;

determining, based on the second electrical detection signal, a contact pressure of the contact of the member with the object; and controlling the actuator to maneuver the member in response to detecting the contact pressure of the contact of the member with the object.

11. The device of claim 10, wherein the second acoustic input signal is a white noise signal.

12. The device of claim 10, wherein detecting the contact of the member with the object external to the member comprises analyzing the at least one of the first detection electrical signal or the second electrical detection signal with a machine learning model to detect the contact of the member with the object external to the member.

13. The device of claim 10, wherein the transducer comprises a transducer and a receiver.

14. The device of claim 13, wherein the transducer and the receiver are both acoustically coupled to the member.

15. The device of claim 10, wherein the transducer comprises a piezoelectric transceiver.

16. A non-transitory computer readable storage medium storing instructions that, when executed by at least one processor, cause the at least one processor to perform operations comprising:

causing a transducer to transmit a first acoustic input signal and a second acoustic input signal into a member of a robotic device, wherein the first acoustic input signal is different from the second acoustic input signal;

receiving, from a first receiver, a first electrical detection signal representing reverberations of the first acoustic input signal traveling within the member as received at a first location along the member;

receiving, from the first receiver, a second electrical detection signal representing reverberations of the second acoustic input signal traveling within the member as received at the first location along the member;

detecting a contact of the member with an object external to the member based on a change in at least one of the first electrical detection signal or the second electrical detection signal;

determining, based on the first electrical detection signal, a position along the member of a point of the contact of the member with the object; and determining, based on the second electrical detection signal, a contact pressure of the contact of the member with the object.

17. The medium of claim 16, further comprising controlling an actuator to maneuver the member in response to the contact.

18. The medium of claim 16, further comprising generating a power spectrum of the at least one of the first electrical detection signal or the second electrical detection signal.

19. The medium of claim 16, wherein determining the position along the member of a point of the contact comprises determining the position based on a change in a power of the first electrical detection signal at a frequency.

20. The medium of claim 16, wherein the second acoustic input signal is a white noise signal.

21. The medium of claim 16, further comprising controlling an actuator to maneuver the member in response determining the contact pressure.

22. The medium of claim 16, further comprising receiving, from a second receiver, a third electrical detection signal representing reverberations of the first acoustic input signal traveling within the member as received at a second location along the member;

wherein determining the position along the member of the point of the contact of the member with the object comprises determining the point of the contact based on both the first electrical detection signal and the third electrical detection signal.

23. The medium of claim 16, wherein the first acoustic input signal is a set of tones calibrated to produce a detection signal with a generally flat power spectrum in the member when an object is not in contact with the member.

* * * * *